United States Patent [19]

Nogami et al.

[11] Patent Number: 4,735,233
[45] Date of Patent: Apr. 5, 1988

[54] ROTARY VALVE

[75] Inventors: Tadahiko Nogami; Ken Ichiryu, both of Ibaraki, Japan

[73] Assignee: Hitachi, Ltd., Tokyo, Japan

[21] Appl. No.: 44,200

[22] Filed: Apr. 30, 1987

Related U.S. Application Data

[63] Continuation of Ser. No. 813,626, Dec. 26, 1985, abandoned.

[30] Foreign Application Priority Data

Dec. 26, 1984 [JP] Japan .................................. 59-272844

[51] Int. Cl.$^4$ ............................................. F16K 31/04
[52] U.S. Cl. ............................ 137/625.65; 137/625.21; 137/625.23; 251/129.12; 310/268
[58] Field of Search ................... 137/625.21, 625.22, 137/625.43, 625.65, 625.23; 251/65, 129.11, 129.12; 310/268, 36, 38, 39; 335/222, 272

[56] References Cited

U.S. PATENT DOCUMENTS

| | | | |
|---|---|---|---|
| 271,928 | 2/1883 | Seeley ................................ | 310/268 |
| 3,118,076 | 1/1964 | Held ................................... | 310/39 |
| 3,293,466 | 12/1966 | Baudot ............................ | 310/268 X |
| 3,858,484 | 1/1975 | Saida . | |
| 4,546,338 | 10/1985 | Idogaki ...................... | 251/129.12 X |

FOREIGN PATENT DOCUMENTS

| | | | |
|---|---|---|---|
| 725962 | 3/1955 | United Kingdom ........... | 137/625.43 |
| 907226 | 10/1962 | United Kingdom ........... | 137/625.21 |

*Primary Examiner*—Robert G. Nilson
*Attorney, Agent, or Firm*—Antonelli, Terry & Wands

[57] ABSTRACT

A rotary valve in which a valve disc provided disposed in a casing is rotated by a driving device, including a disc-shaped rotor provided in a portion of the valve disc and with a plurality of fan-shaped windings arranged in the circumferential direction, magnets provided in such a manner that the polarities thereof are alternately varied in the circumferential direction and a yoke disposed with a predetermined gap from the magnets. The said rotor is disposed between the magnets and the yoke and constitutes a magnetic circuit for rotating the valve disc directly by an electromagnetic power generated in the magnetic circuit.

3 Claims, 2 Drawing Sheets

ROTARY VALVE

This is a continuation application of Ser. No. 813,626, filed Dec. 26, 1985, now abandoned.

BACKGROUND OF THE INVENTION

The present invention relates to a rotary valve having a valve body rotatably mounted in a casing and adapted to be rotated to switch the flow of a fluid to operate an actuator of a robot, a manipulator or the like, and, more particularly, an arrangement including a driving device for directly driving the valve body.

An operating arrangement for a rotary valve operating for switching the flow of a working fluid should be simple, small, easy to control and highly responsive.

A rotary valve has been proposed wherein a pilot element for which a jet pipe or a nozzle flapper is used, and the valve body thereof is driven by an oil pressure amplifying element.

The above-noted proposed rotary valve has a complicated structure, since it is of a two-stage type, and allowance must be made for the capacity of a supply source of the working fluid for compensating an inevitable leakage in a jet pipe element. Additionally, since the jet pipe is a relatively small size, the jet pipe tends to be adversely affected by dirt, and this causes a problem in that a continuous strict control or monitoring of the quality of the working fluid is required.

In, for example, U.S. Pat. No. 3,858,484, a rotary valve is proposed wherein valve body is incorporated in a rotary actuator and that an entire operation from input to output is effected by a rotary motion.

A disadvantage of a rotary valve of this kind resides in the fact that it is not possible to achieve a high response time since an inertial load caused by a reduction gear, when rotation is imparted from a motor, is inputted through this reduction gear, and the control of the valve is reduced by the effect of the backlash of a gear train when a gear train is employed for the reduction gear.

SUMMARY OF THE INVENTION

The aim underlying the present invention essentially resides in providing a rotary valve which simplifies the structure of a driving means for driving a valve body and reduces the size of the driving element.

Another object of the present invention is to provide a rotary valve which is easy to control and has high response time.

In a rotary valve which has a casing and a valve body provided rotatably in the casing and in which said valve body is rotated by the driving force of a driving device to switch the flow of a fluid, the driving device is constructed, according to the present invention, for achieving the above-stated objects, of a disc-shaped rotor provided in a part of the valve body and with a plurality of fan-shaped windings arranged in the circumferential direction, with magnets being provided in such a manner that the polarities thereof are alternately vaired, in the circumferential direction and a yoke disposed with a prescribed gap from and with the magnets, said rotor being disposed between the magnets and the yoke constituting a magnetic circuit, and being directly rotated directly by an electromagnetic power generated in the magnetic circuit.

DETAILED DESCRIPTION

Embodiments of the present invention will be described hereunder with reference to the drawings.

Figure 1:
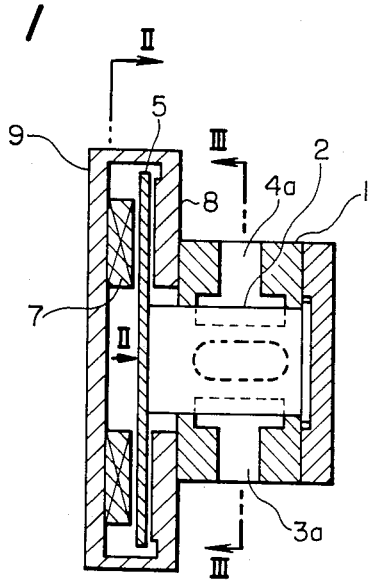
FIG. 1 is a longitudinal sectional view of one embodiment of a rotary valve of the present invention.
Figure 2:
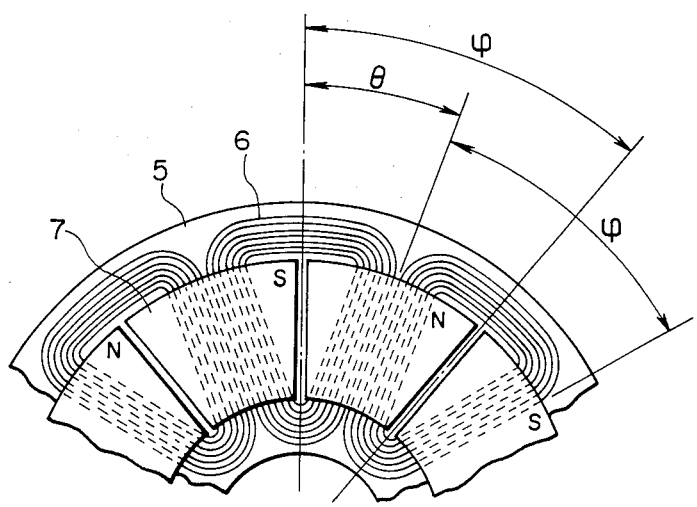
FIG. 2 shows a section taken along a line II—II of FIG. 1.
Figure 3:
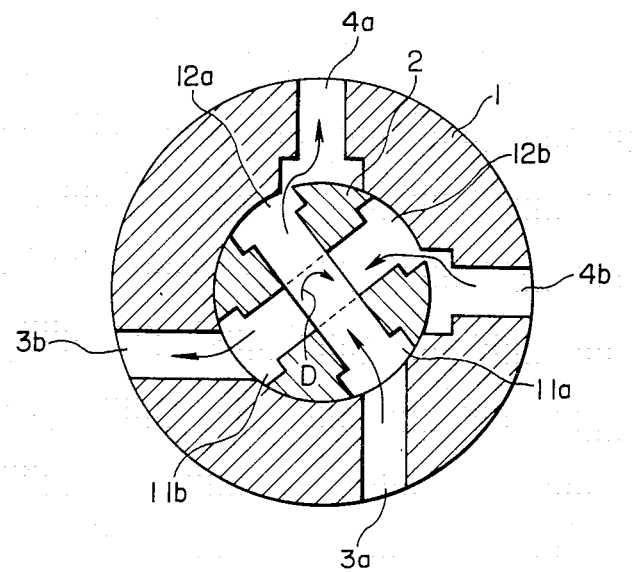
FIG. 3 shows a section taken along a line III—III of FIG. 1.

Referring now to the drawings wherein like reference numerals are used throughout the various views to designate like parts and, more particularly to FIGS. 1 to 3, according to these figures a rotary valve is provided with a hollow cylindrical casing 1 and a valve body 2 rotatably inserted in the casing 1. In this casing 1 a supply port 3a, connected to an oil pressure source, a discharge port 3b, connected to a tank, and control ports 4a and 4b, connected to an actuator, are provided.

In the valve body 2 a supply port 11a, a discharge port 11b, a control port 12a and a control port 12b are provided.

One end side of said valve body 2 projects from the side wall of the casing 1, and a disc-shaped rotor 5 is fixed unitarily to the end portion of the projection. This rotor 5 is provided with a plurality of fan-shaped windings 6 arranged in the circumferential direction as shown in FIG. 2. Adjacent windings 6 are formed so that they are reverse to each other with respect to the direction of current flowing therethrough. An enclosure wall 9, on which magnets 7 constructed in such a manner that the polarities (the N pole and the S pole) thereof are alternately varied in the circumferential direction and a yoke 8 are fixed, is fixed on the side wall of the casing 1 so that they enclose said rotor. The magnets 7 and yoke 8 are disposed so that they are spaced at a prescribed distance from each other and hold the rotor 5 between them, and constitute a magnetic circuit. The angle $\phi$ of the winding 6 and the divided angle $\phi$ in the circumferential direction of the magnet 7 are equal to each other, and in the state in which no current is allowed to flow through the windings 6, the winding 6 and the magnet 7 are maintained at positions separated by an angle $\theta$ ($\phi/2$) from each other. At this time, the supply port 3a and the supply port 11a, and the discharge port 3b and the discharge port 11b, are closed in the casing 1 and the valve body 2 respectively.

When current flows through the windings 6 in the rotor disposed in the magnetic circuit formed of the magnets 7 and the yoke, first, an electromagnetic power is generated in the rotor 5 and thereby a rotary motion is imparted thereto. By this rotary motion of the rotor 5 the valve body 2 is rotated relative to the casing 1. Assuming that the valve body 2 rotates, as shown in FIG. 3, clockwise (in the direction of arrow D) relative to the casing 1, the supply port 3a of the casing 1 is connected to the control port 4a thereof through the supply port 11a and the control port 12a of the valve body 2, and therefore a pressure oil from the oil pressure source is supplied from the supply port 3a to one pressure oil chamber of an actuator through the control port 4a. Meanwhile, the control port 4b of the casing 1 is connected to the discharge port 3b thereof through the control port 12b and the discharge port 11b of the valve body 2, and, consequently, a pressure oil from the other pressure oil chamber of the actuator is discharged from the control port 4b to the discharge port 3b. When the direction of the current flowing through the windings 6 is reversed, the valve body 2 is rotated in the reverse direction to the arrow D relative to the casing 1. At this time, the supply port 3a is connected to the control port 4b, and the discharge port 3b to the control port 4a.

Thus, the valve body 2 is rotated relative to the casing 1 by the rotary motion of the rotor 5, and thereby the supply port 3a of the pressure oil is connected to the control port 4a or 4b, so as to enable the switching of the supply of the pressure oil to the actuator.

By changing the direction and amplitude of the current flowing through the windings 6, a desired rotary motion can be given to the rotor 5 in an angular range of $\pm\theta$.

Accordingly, the present invention makes it unnecessary to provide a driving device element with a jet pipe element and a reduction gear, thus enabling the simplification of the structure of a rotary valve and the miniaturization thereof. Moreover, it enables the attainment of a rotary valve which is substantially free from leakage and affected little by dirt.

In addition, the rotary valve is free from an undesirable inertial load and play such as backlash, since the valve body 2 can be driven directly by the current flowing through the windings 6 of the rotor 5, which results in an easy control and improved responsiveness.

Figure 4:
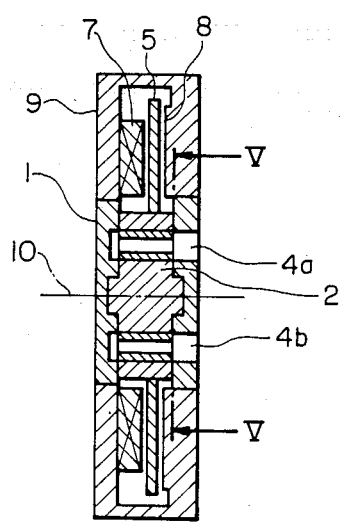
FIG. 4 is a sectional view of another embodiment of the present invention.
Figure 5:
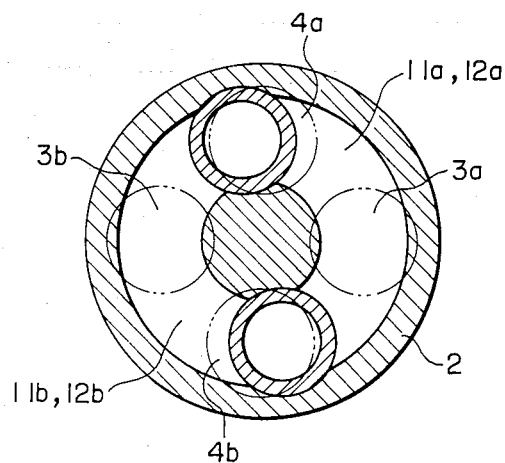
FIG. 5 shows, on an enlarged scale a section taken along a line V—V in FIG. 4.

The embodiment of FIGS. 4 and 5 differs from the embodiment of FIGS. 1 to 3 in that the rotor 5 is provided on the outer peripheral surface of the valve body 2 and that the enclosure wall 9 holding the magnets 7 and the yoke 8 constituting the magnetic circuit is fixed on the outer peripheral side of the casing 1.

Additionally, the supply port 3a, the discharge port 3b and the control ports 4a and 4b for a pressure oil are provided in the casing 1 so that the flow of the pressure oil is parallel to the rotational axis 10 of the valve body 2.

According to the present embodiment, the thickness of the valve body in the axial direction can be made smaller, and thus a rotary valve smaller in size, including the driving device, can be obtained.

As described above, with the present invention it is unnecessary to provide the driving device with a pilot element, such as the jet pipe, and the reduction gear, thus enabling the simplification of the sturcture of the rotary valve and the miniaturization thereof. Moreover, the rotary valve according to the invention is substantially free from leakage, little affected by dirt, and excellent in controllability and responsiveness.

What is claimed is:

1. A rotary valve comprising a casing, a valve body rotatably supported in the casing, a driving means for rotating said valve body within a limited angular range through a driving force to control flow and direction of a fluid, wherein said driving means being an integrated portion of the valve body and includes a disc-shaped rotor having a plurality of fan-shaped windings arranged in a circumferential direction, magnets arranged so that the polarities thereof are alternately varied in the circumferential direction, and a yoke disposed at a predetermined gap from said magnets, said rotor being disposed between the magnets and the yoke unitarily at a side portion of said valve body to provide a magnetic circuit and enable said rotor to directly rotate the valve body by electromagnetism generated in the magnetic circuit, and the magnets and yoke being disposed on a side portion of the casing rotatably supporting the valve body so as to accommodate the rotor therebetween.

2. A rotary valve according to claim 1, wherein a supply port, a discharge port and fluid control ports are arranged in a radial direction of said casing.

3. A rotary valve comprising a casing, a valve body rotatably supported in said casing, a driving means for rotating said valve body within a limited angular range through a driving force to control flow and direction of a fluid, said driving means being an integrated portion of said valve body and includes a disc-shaped rotor having a plurality of fan-shaped windings arranged in a circumferential direction of the rotor, magnets arranged on said casing so that the polarities thereof are alternately varied in the circumferential direction, and a yoke being disposed on said casing at a predetermined gap from said magnets, said rotor being disposed unitarily around an outer peripheral surface of said valve body and between said magnets and yoke to provide a magnetic circuit and enable said rotor to directly rotate said valve body by electromagnetism generated in the magnetic circuit, and the magnets and yoke being disposed on opposite sides of said casing, wherein a supply port, discharge port and fluid control ports are arranged in an axial direction of said casing.

* * * * *